United States Patent [19]
Igarashi

[11] Patent Number: 4,976,522
[45] Date of Patent: Dec. 11, 1990

[54] OBJECTIVE LENS SYSTEM FOR ENDOSCOPES

[75] Inventor: Tsutomu Igarashi, Tokyo, Japan

[73] Assignee: Olympus Optical Co., Ltd., Tokyo, Japan

[21] Appl. No.: 346,598

[22] Filed: May 2, 1989

[30] Foreign Application Priority Data

May 2, 1988 [JP] Japan ................... 63-107642

[51] Int. Cl.⁵ .................. G02B 15/14; G02B 13/18
[52] U.S. Cl. ................... 350/426; 350/423; 350/432
[58] Field of Search ............... 350/432–438, 350/469, 423, 427, 426

[56] References Cited

U.S. PATENT DOCUMENTS

| | | | |
|---|---|---|---|
| 4,042,295 | 8/1977 | Yamasita et al. | 350/445 |
| 4,312,572 | 1/1982 | Yamashita et al. | 350/423 |
| 4,874,232 | 10/1989 | Hasegawa | 350/427 |

FOREIGN PATENT DOCUMENTS 55-15004  4/1980  Japan .
58-193512 11/1983  Japan .
61-44283 10/1986  Japan .

Primary Examiner—Scott J. Sugarman
Attorney, Agent, or Firm—Cushman, Darby & Cushman

[57] ABSTRACT

An objective lens system comprising, in the order from the object side, a first lens group having negative refractive power and a second lens group having positive refractive power, and so adapted as to perform variation of focal length and focusing by shifting the second lens group, with the first lens group kept fixed, in such a manner that magnification of the second lens group satisfies a certain definite condition.

14 Claims, 10 Drawing Sheets

OBJECTIVE LENS SYSTEM FOR ENDOSCOPES

BACKGROUND OF THE INVENTION (a) Field of the Invention

The present invention relates to an objective lens system for endoscopes having a function to vary focal length.

(b) Description of the Prior Art

In the recent years where it is strongly desired to observe magnified images through endoscopes, there have been developed objective lens systems which can be focused on objects located at short distances. For example, Japanese Examined Published Patent Application No. 15004/55 discloses an endoscope which comprises an objective lens system having a retrofocus type composition consisting of a negative front lens group and a positive rear lens group, and is so adapted as to perform focusing by shifting the positive rear lens group. This conventional example of an objective lens system for an endoscope can be focused continuously in a range from far object point to near object point. However, since an endoscope, especially a medical endoscope, requires a variety of operations such as air feeding, water feeding and angle operation other than the focusing operation, an endoscope permitting continuous focusing cannot always perform focusing effectively. Further, it is conceivable to design an optical system which has a field angle wide enough to observe a broad range within a short time so as not to miss abnormal locations and which allows observations in two conditions, i.e., a condition where the objective lens system is focused on an object at such a distance at which an adequate depth of field is kept and the other condition where the objective lens system is focused on an object located at a shorter distance for observing a magnified image of a found abnormal location.

Even when such an optical system is used, however, the focal length for observation of a magnified image is scarcely different from the focal length for ordinary observation. Taking into consideration the necessity to shorten focal length to widen field angle for the ordinary observation, it is impossible to obtain a high magnification level for a short object distance since the objective lens system has a short focal length even when the objective lens system is brought rather close to an object, and the endoscope must be brought nearer the object to obtain a sufficiently high magnification level. In a case where the root of the distal end of an endoscope is bent for observation, for example, sophisticated operating techniques are required to bring the distal end of an endoscope close to an abnormal location while keeping the abnormal location within a visual field even when the abnormal location is found in the ordinary observing condition. Further, due to the limit inherent in the structure of endoscopes, it is often impossible to bring the distal ends of endoscopes close to certain locations which can be observed from certain distances. Therefore, the optical system described above is insufficient for searching for abnormal locations within short times and observing magnified images of found abnormal locations for accurate diagnosis.

In contrast, the endoscope disclosed by Japanese Examined Published Patent Application No. 44283/61 comprises an objective lens system which permits observing objects located at certain long distance at a sufficiently high magnification level since said objective lens system consists of three positive, negative and positive lens groups, and is so adapted as to perform prolonging of focal length while the lens system is focused on an object located at a short distance by shifting the negative lens group.

However, this conventional example is designed as a retrofocus type by dividing the positive first lens group into two positive and negative lens groups in order to obtain a wide angle when the lens system is focused on an object located at a long distance. Accordingly, this lens system is substantially composed of four lens groups, and has a drawback that it has a complicated composition or comprises a large number of lens components.

Further, the objective lens system disclosed by Japanese Unexamined Published Patent Application No. 193512/58 is so designed as to perform zooming and focusing separately. As a result, this objective lens system makes operations of an endoscope combined therewith undesirably complicated, and undesirably thickens outside diameter of the distal end of the endoscope since the objective lens system requires two movable mechanisms in the distal end of the endoscope. From both the functional and structural viewpoints, it is desirable to design a single movable mechanism as a vari-focal mechanism of an objective lens system for endoscopes which can establish a focal length and a focus point at the same time desired for observation.

SUMMARY OF THE INVENTION

A primary object of the present invention is to provide an objective lens system for endoscopes which has a simple composition, and permits observation in at least two conditions, i.e., a condition where an adequate depth of field is maintained at a wide angle of field for searching for an abnormal location and the other condition where a certain adequate distance is reserved from an object at a narrow angle of field for observing a magnified image of the abnormal location.

The objective lens system for endoscopes according to the present invention consists, in the order from the object side, a first lens group having negative refractive power and a second lens group having positive refractive power, and is so adapted as to permit observation in two conditions largely different in focal length by shifting the second lens group, while keeping the first lens group fixed, so as to satisfy the following condition (1):

$$\beta_{2T}' < -1 < \beta_{2W}' \qquad (1)$$

wherein the reference symbol $\beta_{2T}'$ represents magnification of the second lens group for the optimum object point in one of the above-mentioned conditions in which focal length is the longer and the reference symbol $\beta_{2W}'$ designates magnification of the second lens group for the optimum object point in the other of the above-mentioned conditions in which focal length is the shorter.

Now, description will be made on the relationship between a focused object point and focal length of a lens system which consists of two negative and positive lens groups, and is so adapted as to vary magnification $\beta_2'$ of the second lens group by shifting the positive lens group with the negative lens group kept fixed.

Let us assume that the reference numeral 1 represents a first diverging lens group and the reference numeral 2 designated a second converging lens group in FIG. 8. When the focal length of the lens system as a whole is represented by f, focal length of the first lens group is designated by $f_1$, focal length of the second lens group is denoted by $f_2$, magnification of the second lens group for observation of infinite object distance is represented by $\beta_2$ and distance from the first lens group to the rear focal point of the lens system is designated by L, f and L are expressed by the following formulas (i) and (ii):

$$f = f_1 \beta_2 \qquad (i)$$

$$L = f_1 + f_2(2 - \beta_2 - 1/\beta_2) \qquad (ii)$$

When the magnification $\beta_2$ is varied by shifting the second lens group 2, the focal length f varies as expressed by the formula (i) and location of focal point varies as expressed by the formula (ii), making L the minimum at $\beta_2 = -1$ as known to those skilled in the art.

The above description is made taking the object side as standard, but an image point is kept fixed in practical observation. Taking a specific image point as standard, distance to the object point conjugate with the image point is the minimum when the magnification $\beta_2'$ of the second lens group is $-1$ for the image point.

When distance from the front focal point of the first lens group 1 to an object at an optional $\beta_2'$ is represented by x and the distance x at $\beta_2' = -1$ is designated by $x_o$, x is expressed by the following formula (iii):

$$x = \{1/x_o - (f_2/f_1^2)(2 + \beta_2' + 1/\beta_2')\}^{-1} \qquad (iii)$$

wherein the distance x is taken as negative when it is measured leftward in FIG. 8. This definition will be relied upon throughout the following description.

Further, at a fixed image point in a condition where x and $\beta_2'$ have certain fixed values, it is possible to determine values of x at various levels of $\beta_2'$ obtained by shifting the second lens group.

When x at $\beta_2' = \beta_{2W}'$ is represented by $x_W$, the formula (iii) can be transformed into the following formula (iv):

$$x = \{(f_2/f_1^2)(\beta_{2W}' + 1/\beta_{2W}' - \beta_2' - 1/\beta_2') + 1/x_W\}^{-1} \qquad (iv)$$

When $x_o$ in this condition is designated by $x_{ow}$ it can be determined by the following formula (v):

$$x_{ow} = \{1/x_W + (f_2/f_1^2)(2 + \beta_{2W}' + 1/\beta_{2W}')\}^{-1} \qquad (v)$$

FIG. 9 shows a graph illustrating the relationship expressed by the formula (iv). On this graph, $-x$ is taken as the ordinate and $-\beta_2'$ is taken as the abscissa.

When a condition where $\beta_2' = \beta_{2W}'$ is obtained at $x = x_w$ is established on the basis of this graph, it is possible to focus the lens system on an optional object points located at $x \leq x_{ow}$ (since x has negative values, $x \leq x_{ow}$ means distances longer than the distance $x_{ow}$). Further, for an optional object point located at a value of $x \leq x_{ow}$, $\beta_2'$ has two solutions on both the sides respectively of $\beta_2' = -1$.

Now, description will be made on the ratio between the focal lengths. $\beta_2$ and $\beta_2'$ are ordinarily different from each other, and relationship between these focal lengths is expressed by the following formula (vi):

$$\beta_2' = \beta_2/\{1 - (f_1/f_2)\beta\} \qquad (vi)$$

wherein the reference symbol $\beta$ represents magnification of the lens system as a whole as viewed at the object point conjugate with the image point.

When magnification of the lens system as a whole is sufficiently low, the formula (vi) can be approximated as $\beta_2' \approx \beta_2$ and the formula (i) can be approximated as $f \approx f_1 \beta_2'$. Within a range where magnification of the lens system as a whole is not so high, it is therefore permissible to consider that ratio $\gamma$ of focal length f at an optional $\beta_2'$ relative to focal length $f_w$ at $\beta_2' = \beta_{2W}'$ can approximately be expressed by the following formula (vii):

$$\gamma = f/f_w \approx \beta_2'/\beta_{2W}' \qquad (viii)$$

When focal length is varied by setting $\beta_2'$ at two levels by shifting the second lens group with $f_1$ and $f_2$ kept fixed, let us represent object distance and magnification of the second lens group at the shorter focal length by $x_w$ and $\beta_{2W}'$ respectively, and designate object distance and magnification of the second lens group at the longer focal length by $x_T$ and $\beta_{2T}'$ respectively. In such a case, the conventional objective lens systems for endoscopes having the lens composition of the same type as that of the objective lens system according to the present invention and permitting focusing were used only within such a magnification range as to establish relationship of $-1 \leq \beta_{2T}' < \beta_{2W}'$. Accordingly, the conventional objective lens systems for endoscopes of this type did not permit reserving high values of $\gamma = \beta_{2T}'/\beta_{2W}'$. Owing to the fact that the objective lens system for endoscopes according to the present invention is so designed as to satisfy the condition (1), the lens system permits reserving higher values of $\gamma$ while keeping $x_W$ and $x_T$ having the same values as the conventional ones by utilizing the two solutions of $\beta_2'$ obtained by the formula (iv). Accordingly, the objective lens system for endoscopes according to the present invention makes it possible to obtain magnification for observation sufficiently higher than those of the conventional objective lens systems even when $x_T$ becomes large to a certain degree in absolute value thereof.

In the shorter focal length condition, it is necessary that the endoscopes comprising the objective lens system according to the present invention are usable in the same manner as the endoscopes incorporating objective lens systems having fixed focal points. For this purpose, the focal length $f_W$ must have an adequate value matched with the required field angle and the distance $x_W$ to an object to be focused at that field angle must have an adequate value matched with the depth of field.

On the curve illustrated in FIG. 9, it is possible to optionally select the shorter focal length condition ($\beta_2' > -1$) which is defined as a condition at which the far point of depth of field is set at around $-60$ mm for the reason described above. Depth of field is calculated here by the following formula (viii):

$$|1/x - 1/x_W| = \delta F_W/f_W^2 \qquad (viii)$$

Two solutions of x calculated by the above formula correspond to the near point and the far point respectively of depth of field. In this formula, the reference symbol $\delta$ represents diameter of the circle of confusion on the image plane and the reference symbol $f_W$ designates effective aperture ratio in the shorter focal length condition. A value of $\delta$ is 1 to 4 times the spacing between optical fibers or picture elements when the objective lens system is to be used in combination with a fiber scope or a monochromatic solid-state image sensor, or 2 to 10 times of spacing between picture elements when the objective lens system is to be used in combination with a single-plate color solid-state image sensor.

Now, description will be made on a desirable range of $\beta_{2W}'$. A smaller absolute value of $\beta_{2W}'$ is more desirable since it allows reservation of a higher vari-focal ratio. In a case where an object distance is assumed to be unvaried between the two conditions, it is sufficient for obtaining a vari-focal ratio higher than 1.1 that $\beta_{2W}'$ has a value larger than $-0.95$. When an aperture stop is fixed in the optical system, however, it is not allowed to enhance the vari-focal ratio indiscreetly. In an objective lens system for endoscopes, an aperture stop is arranged ordinarily between a negative lens group and a positive lens group, taking into consideration adaptability to widening of field angle, height of ray on each lens, angle of emergence of the principal ray and so on. In case of an objective lens system for fiber scopes, an aperture stop must be arranged in the vicinity of the front focal point of a positive lens group since a telecentric optical system is required. Further, a telecentric optical system may be desired for video scopes using the single-plate color solid-state image sensors in which colors may be made uniform by the rays incident obliquely on the solid-state image sensor. When an aperture stop is arranged at the location of the front focal point of a positive lens group in a lens system composed only of thin lenses for designing it as a telecentric optical system in the shorter focal length condition, the spacing between the positive lens group and the aperture stop is $f_2$. In order to prolong focal length of the objective lens system in this condition, the positive lens group must be shifted for a distance $\Delta$ toward the negative lens group. When $\Delta$ has a value larger than $f_2$, the positive lens group is brought into contact with the aperture stop. Therefore, $\Delta$ must have a value smaller than $f_2$. Further, it is necessary to shift the positive lens group until $\beta_2'$ becomes equal to $-1$. When $\beta_2'$ is equal to $-1$, $\Delta$ has the following value:

$$\Delta = f_2(-1/\beta_{2W}' - 1)$$

Hence, $\beta_2'$ must be smaller than $-0.5$ to satisfy $\Delta < f_2$.

When a brightness stop is kept fixed, it is therefore necessary that $\beta_2'$ has a value within the range defined below:

$$-0.95 < \beta_{2W}' < -0.5$$

Further, description will be made on a desirable range of $f_2$.

L is determined by the formula (ii). When L is normalized by $f_W$ and the formula (ii) is transformed by using the relationship of $f_W \approx f_1 \beta_{2W}$, the following formula is obtained:

$$L/f_W = (f_2/f_W)(2 - \beta_{2W}' - 1/\beta_{2W}') + 1/\beta_{2W}'$$

Since the values enclosed by the parentheses and that of $1/\beta_{2W}'$ in the above formula do not vary so much within the above-mentioned range of $\beta_{2W}'$, the above-mentioned formula can be transformed as follows by adopting $\beta_{2W}' = 0.75$ as a typical value:

$$L/f_W = 4.083 \cdot f_2/f_W - 1.33$$

When $f_2/f_W$ has a larger value in this formula, $L/f_W$ also has a larger value, thereby prolonging total length of the optical system. Since the optical system is not prolonged so much when it is designed so as to satisfy $L/f_W < 15$, it is sufficient to select a range of $f_2/f_W < 4$. Since the above-described range of $\beta_{2W}'$ is larger in absolute value than that in the ordinary retrofocus type objective lens system, power of the negative lens group is apt to be strengthened and Petzval's sum is apt to have a negative value in the objective lens system according to the present invention. Accordingly, $f_2/f_W$ should desirably have a value as small as possible also for moderating overcorrection of Petzval's sum by strengthening power of the positive lens group. When $f_2/f_W$ is too small, however, the negative lens group will have too strong a power, thereby making it difficult to correct the other aberrations and allowing location of the exit pupil to be shifted too remarkably by switching the two conditions from one to the other. It is therefore desirable to select $f_2/f_W > 1$. For this purpose, it is desirable to design the objective lens system for endoscopes according to the present invention so as to satisfy the following condition:

$$1 < f_2/f_W 4$$

In the composition of the objective lens system described above, it is possible to arrange an additional third fixed lens group between the movable positive lens group and the image point. Since the focal length f of the objective lens system as a whole varies to $f = f_1 \beta_2 \beta_3$ and the imaging relationship with regard to the third lens group is also changed in this case, L is varied as expressed below and the imaging relationship with regard to the pupil is also changed:

$$L = f_2(2 - \beta_2 - 1/\beta_2) + f_1 + f_3(2 - \beta_3 - 1)$$

wherein the reference symbol $\beta_3$ represents magnification of the third lens group in the condition for observing an object located at infinite distance.

Since only the second lens group is shifted even when the third lens group is arranged, the vari-focal principle and the focusing principle described above are unchanged from those in the objective lens system consisting only of two lens groups, and the objective lens system for endoscopes according to the present invention should be designed so as to satisfy the above-mentioned conditions even when it has the composition comprising the third lens group.

DETAILED DESCRIPTION OF THE PREFERRED EMBODIMENTS

Figure 1:
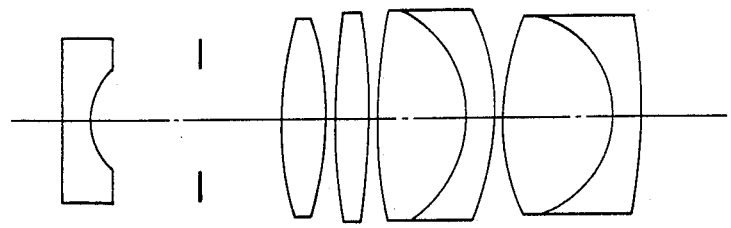
FIG. 1 through FIG. 7 show sectional views illustrating Embodiments 1 through 7 of the objective lens system for endoscopes according to the present invention.

The Embodiments of the objective lens system for endoscopes according to the present invention have the compositions illustrated in FIG. 1 through FIG. 7 and the numerical data listed below:

EMBODIMENT 1

$f_W = 1$ mm, $f_T = 1.453$ mm
F/2.53 (in shorter focal length),
F/3.76 (in longer focal length)
field angle in shorter focal length = 97.5°
field angle in longer focal length = 62.3°
image height = 0.78

$r_1 = \infty$
  $d_1 = 0.5000$  $n_1 = 1.88300$  $\nu_1 = 40.76$
$r_2 = 1.1434$
  $d_2 = 1.7933$
$r_3 = \infty$ (stop)
  $d_3 = D_1$ (variable)
$r_4 = 4.9449$
  $d_4 = 0.8000$  $n_2 = 1.51633$  $\nu_2 = 64.15$
$r_5 = -4.4637$
  $d_5 = 0.1000$
$r_6 = 9.7306$
  $d_6 = 0.6500$  $n_3 = 1.51633$  $\nu_3 = 64.15$
$r_7 = -8.3496$
  $d_7 = 0.1000$
$r_8 = 8.0402$
  $d_8 = 1.5000$  $n_4 = 1.51633$  $\nu_4 = 64.15$
$r_9 = -2.0253$
  $d_9 = 0.5000$  $n_5 = 1.84666$  $\nu_5 = 23.78$
$r_{10} = -3.7518$
  $d_{10} = 0.1000$
$r_{11} = 4.0828$
  $d_{11} = 1.8000$  $n_6 = 1.51633$  $\nu_6 = 64.15$
$r_{12} = -1.7000$
  $d_{12} = 0.5000$  $n_7 = 1.84666$  $\nu_7 = 23.78$
$r_{13} = -9.0079$
  $d_{13} = D_2$ (variable)
$r_{14} = \infty$ $\beta_{2W'} = -0.8$,  $\beta_{2T'} = -1.204$
$D_1$  1.339  0.370
$D_2$  1.193  2.161
$f_2/f_W = 2.4$, $\delta = 20\ \mu$
$x_W = 14$ mm, $x_T = 10$ mm
depth of field in shorter focal length = 7.5 mm ~ 61.7 mm
depth of field in longer focal length = 7.0 mm ~ 16.7 mm

EMBODIMENT 2

$f_W = 1$ mm, $f_T = 1.312$ mm
F/3.09 (in shorter focal length),
F/4.10 (in longer focal length)
field angle in shorter focal length = 98.8°
field angle in longer focal length = 67.9°
image height = 0.78

$r_1 = \infty$
  $d_1 = 0.5000$  $n_1 = 1.88300$  $\nu_1 = 40.76$
$r_2 = 1.0452$
  $d_2 = 1.6861$
$r_3 = \infty$ (stop)
  $d_3 = D_1$ (variable)
$r_4 = 7.9567$
  $d_4 = 0.6500$  $n_2 = 1.51633$  $\nu_2 = 64.15$
$r_5 = -2.7652$
  $d_5 = 0.1000$
$r_6 = 26.6320$
  $d_6 = 0.7000$  $n_3 = 1.51633$  $\nu_3 = 64.15$
$r_7 = -3.1752$
  $d_7 = 0.1000$
$r_8 = 4.9616$
  $d_8 = 1.7000$  $n_4 = 1.51633$  $\nu_4 = 64.15$
$r_9 = -1.5434$
  $d_9 = 0.5000$  $n_5 = 1.84666$  $\nu_5 = 23.78$
$r_{10} = -4.1618$
  $d_{10} = D_2$ (variable)
$r_{11} = \infty$ $\beta_{2W'} = -0.88$,  $\beta_{2T'} = -1.162$
$D_1$  1.083  0.464
$D_2$  2.223  2.843
$f_2/f_W = 2.2$, $\delta = 20\ \mu$
$x_W = 12$ mm, $x_T = 14$ mm
depth of field in shorter focal length = 6.3 mm ~ 63.1 mm
depth of field in longer focal length = 7.9 mm ~ 48.8 mm

EMBODIMENT 3

$f_W = 1$ mm, $f_T = 2.172$ mm
F/4.03 (in shorter focal length),
F/4.94 (in longer focal length)
field angle in shorter focal length = 98.1°
field angle in longer focal length = 41.1°
image height = 0.78

$r_1 = \infty$
  $d_1 = 0.5000$  $n_1 = 1.88300$  $\nu_1 = 40.76$
$r_2 = 1.3400$
  $d_2 = D_1$ (variable)
$r_3 = \infty$ (stop)
  $d_3 = 0.6529$
$r_4 = 3.4756$ (aspherical surface)
  $d_4 = 0.6000$  $n_2 = 1.51633$  $\nu_2 = 64.15$
$r_5 = -3.7048$
  $d_5 = 0.1000$
$r_6 = -14.6253$
  $d_6 = 0.6000$  $n_3 = 1.51633$  $\nu_3 = 64.15$
$r_7 = -2.5260$
  $d_7 = 0.1000$
$r_8 = 23.2463$
  $d_8 = 1.5000$  $n_4 = 1.51633$  $\nu_4 = 64.15$
$r_9 = -1.2923$
  $d_9 = 0.5000$  $n_5 = 1.84666$  $\nu_5 = 23.78$
$r_{10} = -2.9080$
  $d_{10} = D_2$ (variable)
$r_{11} = \infty$ aspherical surface coefficient
P = 1.0000, $A_2 = 0$, $A_4 = -0.25990 \times 10^{-1}$
$A_6 = 0.34440 \times 10^{-1}$
$\beta_{2W'} = -0.7$,  $\beta_{2T'} = -1.519$
$D_1$  2.931  0.966
$D_2$  2.291  4.256
$f_2/f_W = 2.4$, $\delta = 20\ \mu$
$x_W = 9$ mm, $x_T = 22$ mm
depth of field in shorter focal length = 4.4 mm ~ 54.8 mm
depth of field in longer focal length = 14.8 mm ~ 41.8 mm

EMBODIMENT 4

$f_W = 2.265$ mm, $f_T = 3.672$ mm
F/5.45 (in shorter focal length),
F/9.62 (in longer focal length)
field angle in shorter focal length = 85.0°
field angle in longer focal length = 45.8°
image height = 1.6

$r_1 = \infty$
  $d_1 = 0.6000$  $n_1 = 1.88300$  $\nu_1 = 40.78$
$r_2 = 3.4470$
  $d_2 = 0.5500$
$r_3 = \infty$
  $d_3 = 5.1500$  $n_2 = 1.80610$  $\nu_2 = 40.95$
$r_4 = \infty$ (stop)

-continued

| | $d_4 = D_1$ (variable) | | |
|---|---|---|---|
| $r_5 = 7.2590$ | $d_5 = 1.3000$ | $n_3 = 1.56873$ | $\nu_3 = 63.16$ |
| $r_6 = -7.2590$ | $d_6 = 0.1000$ | | |
| $r_7 = \infty$ | $d_7 = 0.9000$ | $n_4 = 1.56873$ | $\nu_4 = 63.16$ |
| $r_8 = -6.1630$ | $d_8 = D_2$ (variable) | | |
| $r_9 = 12.6390$ | $d_9 = 1.8000$ | $n_5 = 1.51633$ | $\nu_5 = 64.15$ |
| $r_{10} = -2.5980$ | $d_{10} = 0.7000$ | $n_6 = 1.84666$ | $\nu_6 = 23.78$ |
| $r_{11} = -8.3140$ | $d_{11} = 0.1500$ | | |
| $r_{12} = \infty$ | $d_{12} = 0.5000$ | $n_7 = 1.51633$ | $\nu_7 = 64.15$ |
| $r_{13} = \infty$ | $d_{13} = 2.7600$ | | |
| $r_{14} = \infty$ | $d_{14} = 1.0000$ | $n_8 = 1.51633$ | $\nu_8 = 64.15$ |
| $r_{15} = \infty$ | | | |

$\beta_{2W}' = -0.717$, $\beta_{2T}' = -1.302$
$D_1$   3.060   0.500
$D_2$   0.700   3.260
$f_2/f_W = 1.933$, $\delta = 36\mu$
$x_W = 16$ mm, $x_T = 12$ mm
depth of field in shorter focal length = 8.6 mm ~ 56.4 mm
depth of field in longer focal length = 8.8 mm ~ 18.4 mm

EMBODIMENT 5

$f_W = 2.265$ mm, $f_T = 3.748$ mm
F/5.50 (in shorter focal length),
F/9.93 (in longer focal length)
field angle in shorter focal length = 80.6°
field angle in longer focal length = 43.5°
image height = 1.54

| | | | |
|---|---|---|---|
| $r_1 = -6.2823$ | $d_1 = 0.8000$ | $n_1 = 1.88300$ | $\nu_1 = 40.78$ |
| $r_2 = -3.5704$ | $d_2 = 0.4000$ | $n_2 = 1.53256$ | $\nu_2 = 85.91$ |
| $r_3 = 2.1730$ | $d_3 = 0.6500$ | | |
| $r_4 = \infty$ | $d_4 = 5.1500$ | $n_3 = 1.80610$ | $\nu_3 = 40.95$ |
| $r_5 = \infty$ (stop) | $d_5 = D_1$ (variable) | | |
| $r_6 = 6.0248$ | $d_6 = 1.3000$ | $n_4 = 1.56873$ | $\nu_4 = 63.16$ |
| $r_7 = -8.1683$ | $d_7 = 0.1000$ | | |
| $r_8 = \infty$ | $d_8 = 0.9000$ | $n_5 = 1.56873$ | $\nu_5 = 63.16$ |
| $r_9 = -6.6042$ | $d_9 = D_2$ (variable) | | |
| $r_{10} = 21.7526$ | $d_{10} = 1.8000$ | $n_6 = 1.53256$ | $\nu_6 = 45.91$ |
| $r_{11} = -2.3886$ | $d_{11} = 0.7000$ | $n_7 = 1.84666$ | $\nu_7 = 23.78$ |
| $r_{12} = -8.7018$ | $d_{12} = 0.1500$ | | |
| $r_{13} = \infty$ | $d_{13} = 0.5000$ | $n_8 = 1.51633$ | $\nu_8 = 64.15$ |
| $r_{14} = \infty$ | $d_{14} = 3.4526$ | | |
| $r_{15} = \infty$ | $d_{15} = 1.0000$ | $n_9 = 1.51633$ | $\nu_9 = 64.15$ |
| $r_{16} = \infty$ | | | |

$\beta_{2W}' = -0.717$, $\beta_{2T}' = -1.324$
$D_1$   3.154   0.500
$D_2$   0.700   3.354
$f_2/f_W = 1.93$, $\delta = 36\ \mu$
$x_W = 16$ mm, $x_T = 12$ mm
depth of field in shorter focal length = 8.6 mm ~ 57.5 mm
depth of field in longer focal length = 8.8 mm ~ 18.3 mm

EMBODIMENT 6

$f_W = 2.265$ mm, $f_T = 3.679$ mm
F/5.40 (in shorter focal length),
F/9.64 (in longer focal length)
field angle in shorter focal length = 83.5°
field angle in longer focal length = 45.8°
image height = 1.58

| | | | |
|---|---|---|---|
| $r_1 = -11.9594$ (aspherical surface) | $d_1 = 0.6000$ | $n_1 = 1.53256$ | $\nu_1 = 45.91$ |
| $r_2 = 2.3414$ | $d_2 = 0.6500$ | | |
| $r_3 = \infty$ | $d_3 = 5.1500$ | $n_2 = 1.80610$ | $\nu_2 = 40.95$ |
| $r_4 = \infty$ (stop) | $d_4 = D_1$ (variable) | | |
| $r_5 = 6.5824$ | $d_5 = 1.3000$ | $n_3 = 1.56873$ | $\nu_3 = 63.16$ |
| $r_6 = -7.9659$ | $d_6 = 0.1000$ | | |
| $r_7 = 163.6489$ | $d_7 = 0.9000$ | $n_4 = 1.56873$ | $\nu_4 = 63.16$ |
| $r_8 = -6.4264$ | $d_8 = D_2$ (variable) | | |
| $r_9 = 9.4536$ | $d_9 = 1.8000$ | $n_5 = 1.51742$ | $\nu_5 = 52.41$ |
| $r_{10} = -2.5762$ | $d_{10} = 0.7000$ | $n_6 = 1.84666$ | $\nu_6 = 23.78$ |
| $r_{11} = -12.9018$ | $d_{11} = 0.1500$ | | |
| $r_{12} = \infty$ | $d_{12} = 0.5000$ | $n_7 = 1.51633$ | $\nu_7 = 64.15$ |
| $r_{13} = \infty$ | $d_{13} = 2.8897$ | | |
| $r_{14} = \infty$ | $d_{14} = 1.0000$ | $n_8 = 1.51633$ | $\nu_8 = 64.15$ |
| $r_{15} = \infty$ | | | | aspherical surface coefficient
$P = 1.0000$, $A_2 = 0$, $A_4 = 0$
$A_6 = 0.38731 \times 10^{-3}$
$\beta_{2W}' = -0.717$, $\beta_{2T}' = -1.312$
$D_1$   3.104   0.500
$D_2$   0.700   3.304
$f_2/f_W = 1.93$, $\delta = 36\ \mu$
$x_W = 16$ mm, $x_T = 12$ mm
depth of field in shorter focal length = 8.7 mm ~ 54.6 mm
depth of field in longer focal length = 8.9 mm ~ 18.2 mm

EMBODIMENT 7

$f_W = 1$ mm, $f_T = 1.312$ mm
F/3.07 (in shorter focal length),
F/4.08 (in longer focal length)
field angle in shorter focal length = 85.5°
field angle in longer focal length = 60.5°
image height = 0.71

| | | | |
|---|---|---|---|
| $r_1 = -3.0456$ (aspherical surface) | $d_1 = 0.5000$ | $n_1 = 1.51633$ | $\nu_1 = 64.15$ |
| $r_2 = 0.8074$ | $d_2 = 1.6567$ | | |
| $r_3 = \infty$ (stop) | $d_3 = D_1$ (variable) | | |
| $r_4 = 6.9407$ | $d_4 = 0.6500$ | $n_2 = 1.51633$ | $\nu_2 = 64.15$ |
| $r_5 = -4.0459$ | $d_5 = 0.1000$ | | |
| $r_6 = 5.7317$ | | | |

-continued

| | $d_6 = 0.7000$ | | $n_3 = 1.51633$ | $\nu_3 = 64.15$ |
|---|---|---|---|---|
| $r_7 = -3.4610$ | | | | |
| | $d_7 = 0.1000$ | | | |
| $r_8 = 5.3424$ | | | | |
| | $d_8 = 1.7000$ | | $n_4 = 1.51633$ | $\nu_4 = 64.15$ |
| $r_9 = -1.5000$ | | | | |
| | $d_9 = 0.5000$ | | $n_5 = 1.84666$ | $\nu_5 = 23.78$ |
| $r_{10} = -3.8961$ | | | | |
| | $d_{10} = D_2$ (variable) | | | |
| $r_{11} = \infty$ | | | | | aspherical surface coefficient
$P = 1.0000$, $A_2 = 0$, $A_4 = 0$
$A_6 = 0.19829 \times 10^{-1}$
$\beta_{2W}' = -0.88$,     $\beta_{2T}' = -1.16$
$D_1$    1.026    0.406
$D_2$    2.205    2.825
$f_2/f_W = 2.2$, $\delta = 20 \mu$
$x_W = 12$ mm, $x_T = 14$ mm
depth of field in shorter focal length = 6.3 mm ~ 61.0 mm
depth of field in longer focal length = 7.95 mm ~ 48.1 mm wherein the reference symbols $r_1$, $r_2$, . . . . . represent radii of curvature on the surfaces of the respective lens elements, the reference symbols $d_1$, $d_2$, . . . . . designate thicknesses of the respective lens elements and airspaces reserved therebetween, the reference symbols $n_1$, $n_2$, . . . . . denotes refractive indices of the respective lens elements, and the reference symbols $\gamma_1$, $\gamma_2$, . . . . . represent Abbe's numbers of the respective lens elements.

All of these Embodiments are designed for a field angle of about 100° in the shorter focal length condition to permit observation at sufficiently wide field angles. As for the depth of field of these Embodiments, the far point is located at around 60 mm so as to meet sufficiently the requirement for the ordinary observation.

The Embodiment 1 has the composition illustrated in FIG. 1 and is designed as an objective lens system as bright, at the two focal lengths, as the objective lens system having a fixed focal point without increasing number of the lens components or enlarging the optical systems. In this Embodiment, the depth of field in the longer focal length condition is set so as to be overlapped with that in the shorter focal length condition in the vicinity of the near point of the depth of field in the shorter focal length condition. This design makes it possible to observe a magnified image in the shorter focal length condition with an object located close to the near point of the depth of field and observe an image further magnified in the longer focal length condition. In order to avoid contact between the positive lens group to be shifted for varying focal length and the aperture stop, power distribution in this lens group is so selected as to locate the front principal point of the positive lens group as close as possible to the aperture stop. For this purpose, it is necessary to arrange a lens component having strong power on the aperture stop side in the movable lens group, but aberrations cannot be corrected simply by arranging a convex lens component on the object side of the cemented doublet. For this reason, two positive lens components are arranged in the Embodiment 1. Further, the lens component arranged nearest the aperture stop has the strongest power and is designed, taking location of the principal point into consideration, not as a meniscus lens component producing low aberrations but as a biconvex lens component. Accordingly this biconvex lens component has a radius of curvature $R_A > 0$ on the side of the aperture stop.

Figure 2:
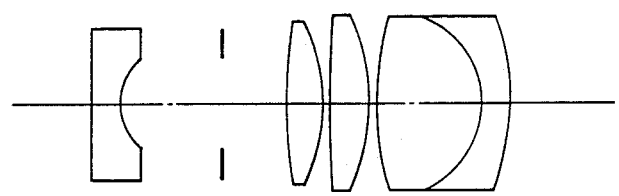

The Embodiment 2 has the composition illustrated in FIG. 2 consisting only of five lens elements, as small a number of lens elements as that in the ordinary retrofocus type objective lens system, and is usable at two focal lengths. The Embodiment 2 has a depth of field which is set with the main emphasis placed on the far point taking brightness into consideration. Since an object observed through an endoscope is illuminated with an illumination system built therein, brightness of the object is inversely proportional to square of the distance to the observed object. Further, brightness is inversely proportional to F number of the objective lens system of the endoscope. Since F number of a vari-focal optical system like the objective lens system according to the present invention varies depending on the focal length conditions, brightness is varied when the focal length condition is changed while observing an object located at a fixed distance. In case of an optical system comprising a fixed stop, F number is substantially proportional to vari-focal ratio and brightness in the longer focal length condition is lower than that in the shorter focal length condition. In the Embodiment 2, a limit distance to an object observable at the brightness in the shorter focal length condition is taken as 60 mm, a limit distance for observation at the brightness in the longer focal length condition is determined taking increase of F number into consideration and the far point of the depth of field in the longer focal length condition is set in the vicinity of the limit distance for observation. The Embodiment 2 is designed as an objective lens system having a depth of field broadened also on the side of the far point thereof so as to permit observation in wide distance ranges at two field angles of 100° and 70°.

The Embodiment 3 is so designed as to shift an aperture stop together with the positive lens group. The advantages obtained by shifting the aperture stop together with the positive lens group are capability to reserve a high vari-focal ratio, little variation of the exit pupil, little variation of brightness to be caused by variation of focal length owing to little variation of F number and so on. The objective lens system comprising the fixed aperture stop does not permit reserving so high a vari-focal ratio due to the problem of contact between the aperture stop and the movable positive lens group. In contrast, the Embodiment 2 wherein the aperture stop is shifted together with the positive lens group is free from the problem and has a vari-focal ratio higher than 2. Further, the Embodiment 3 is designed for an unvariable distance as measured from the final surface of the positive lens group to the exit pupil and allows little variation of brightness as compared with that in the objective lens system wherein the distance as measured from the final surface of the positive lens group to the exit pupil is varied and the fixed aperture stop is fixed. Furthermore, the Embodiment 3 is so designed as to bring the aperture stop close to the negative lens group in the longer focal length condition for allowing a thicker light flux to pass therethrough, thereby capable of preventing F number from being increased and minimizing variation of brightness. In the Embodiment 3, the depth of field is set taking brightness into consideration as in the case of the Embodiment 2. Accordingly, the Embodiment 2 is designed as an objective lens system capable of reserving a broad depth of field even in the longer focal length condition, and having two field angles of 100° and 40°. In addition, the Embodiment 3 is an objective lens system whose brightness is not lowered at the high vari-focal ratio described above.

In the Embodiment 3, the surface of the movable positive lens group located nearest the aperture stop is designed as an aspherical surface. In most of the retrofocus type objective lens systems for endoscopes, the lens component located nearest the aperture stop in the rear lens group is designed as a meniscus lens component whose surface located on the side of the aperture stop has negative curvature for preventing production of aberrations. In contrast, in the objective lens system according to the present invention wherein the positive lens group must be shifted for a long distance and the location of the principal point thereof must be limited to a certain degree accordingly, the lens component arranged at the location closest to the aperture stop in the real lens group is designed as a biconvex lens component and the surface thereof located on the side of the aperture stop has positive curvature. Accordingly, this surface produces remarkable spherical aberration, astigmatism, coma and so on. In order to minimize these aberrations, the surface of the biconvex lens component located on the side of the aperture stop is designed as an aspherical surface in the Embodiment 3.

When the direction along the optical axis is taken as the x axis, the direction perpendicular to the optical axis is taken as the y axis and radius of curvature at the vertex of the aspherical surface is represented by r, shape of the above-mentioned aspherical surface is expressed by the following formula:

$$x = \frac{y^2/r}{1 + \sqrt{1 - p(y/r)^2}} + \sum_{i=1} A_{2i} y^{2i}$$

wherein the reference symbol P represents the conic constant and the reference symbol $A_{2i}$ designates the coefficient of aspherical surface of the 2i'th order.

Figure 4:
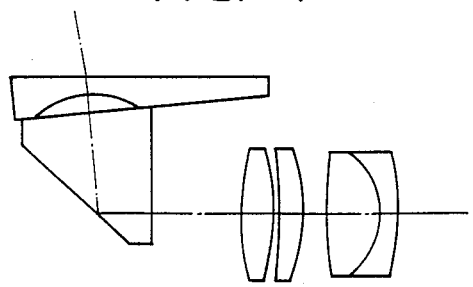

The Embodiment 4 has the composition illustrated in FIG. 4 wherein the objective lens system is composed of three lens groups and is so adapted as to perform variation of focal length by shifting the second lens group. Also in the Embodiment 4, a depth of field in the longer focal length condition is set on the concept similar to that adopted for the Embodiment 1.

Figure 5:
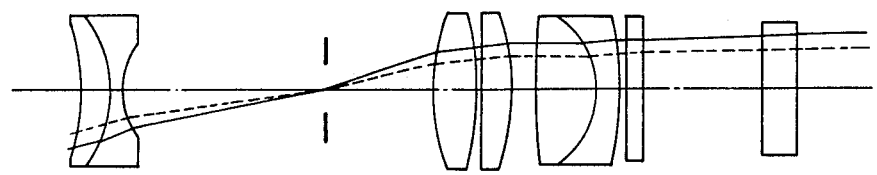

The Embodiment 5 has the composition illustrated in FIG. 5 wherein the objective lens system is composed of three lens groups including the first negative lens group designed as a cemented doublet. When a cemented surface having negative power is arranged only in the optical system located after the aperture stop and the power is adjusted for correcting the astigmatism in the longer focal length condition, the principal ray passing through this cemented surface is enhanced in the shorter focal length condition and the astigmatism is overcorrected accordingly in the shorter focal length condition. As a result, the image planes in the two conditions are deviated from each other. Though the image plane in one condition can be brought to the paraxial image plane, the image plane in the other condition is curved and deviated from the paraxial image plane in the offaxial portion. In order to correct this deviation, the Embodiment 5 comprises, at a location in the negative lens group arranged before the aperture stop at which the height of the principal ray is largely different between the two focal length conditions, a cemented surface having positive power so as to impart a function for undercorrecting the astigmatism to the rays in the vicinity of the principal ray passing through the lens portion apart from the optical axis out of the rays passing through the cemented surface. This design is effective to cancel the overcorrected astigmatism produced in the shorter focal length condition. Owing to this design, the image plane is varied little between the two focal length conditions and is curved little in absolute value in the Embodiment 5.

Figure 6:
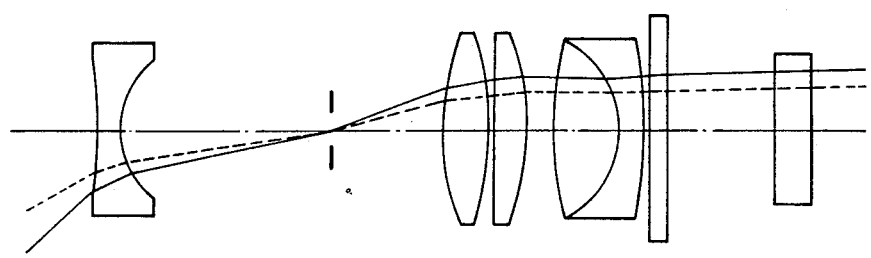

The Embodiment 6 has the composition illustrated in FIG. 6 wherein an aspherical surface is adopted on the first negative lens group. This aspherical surface is adopted for preventing the image plane from deviating between the two focal length conditions like the cemented surface having positive power adopted in the lens group arranged before the aperture stop in the Embodiment 5. This aspherical surface has such a shape as to have negative power on the optical axis and weaker negative power, i.e., lower curvature on the marginal portion so as to have a function to undercorrect the astigmatism. This aspherical surface should desirably be arranged at a location where the principal ray is high and the most desirable location for this aspherical surface is the first surface of the objective lens system. Further, this aspherical surface can be designed as a surface having positive power on the optical axis and, in this case, should have such a shape as to strengthen the positive power on the marginal portion, i.e., have higher curvature on the marginal portion.

Figure 7:
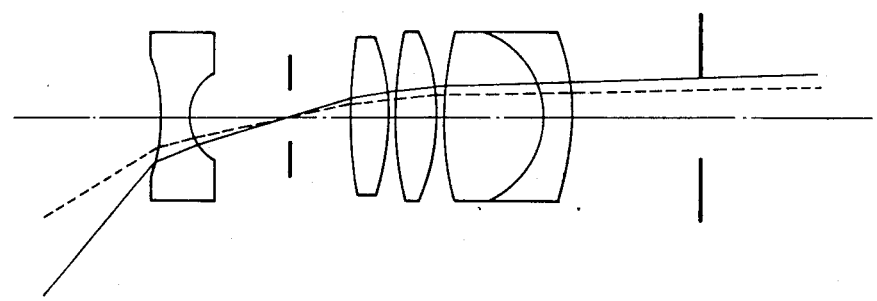
Figure 8:
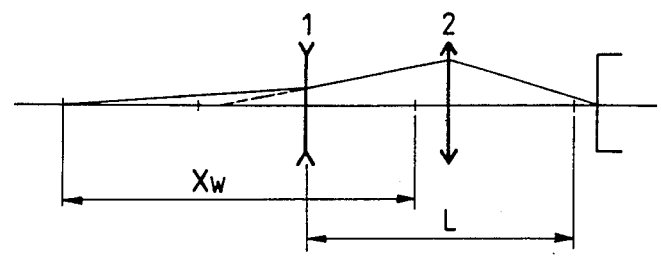
FIG. 8 shows a diagram illustrating the imaging relationship of the retrofocus type objective lens system.
Figure 8:
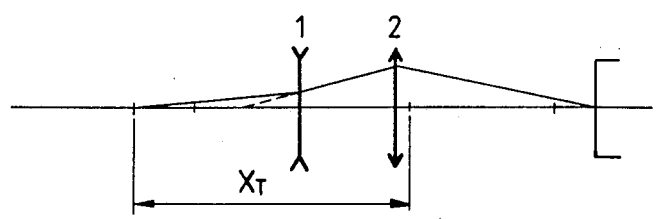
Figure 9:
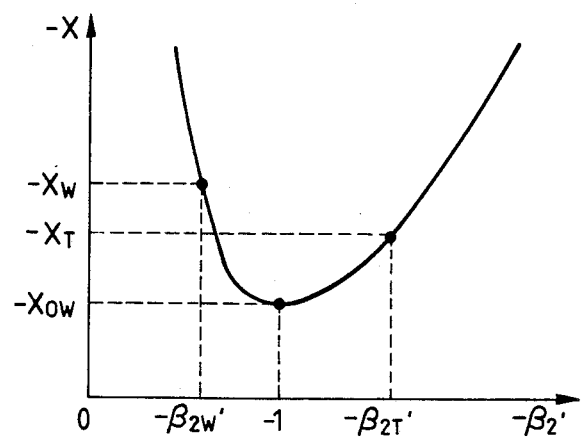
FIG. 9 shows a graph illustrating relationship between magnification and object distance for said retrofocus type objective lens system shown in FIG. 8; and FIG. 10 through FIG. 23 shows curves illustrating aberration characteristics of the Embodiments of the present invention.

The Embodiment 7 has the composition illustrated in FIG. 7 wherein the first surface of the first negative lens group is designed as an aspherical surface having negative power which is weakened toward the marginal portion for the same purpose as that in the Embodiments 5 and 6.

Figure 3:
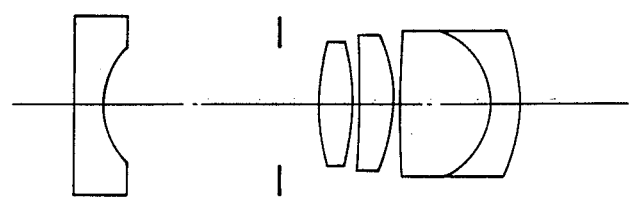
Figure 10:
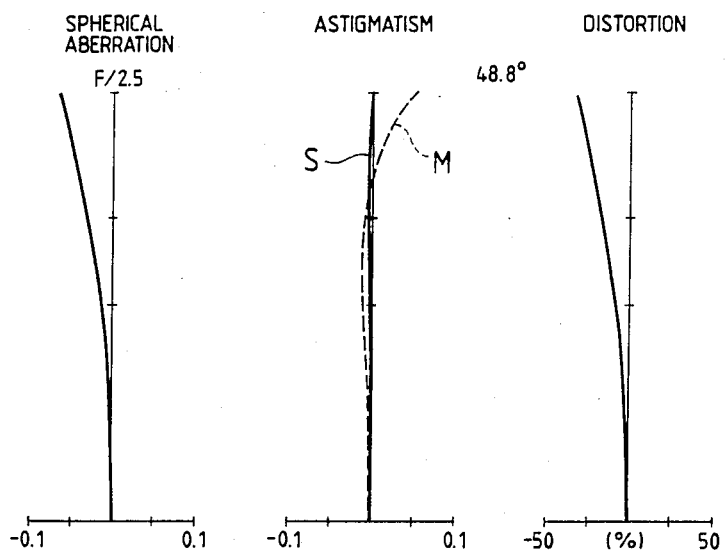
Figure 11:
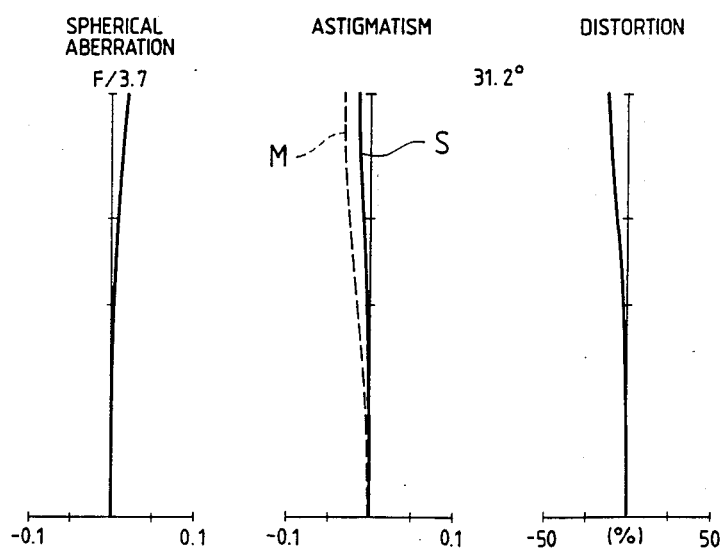
Figure 12:
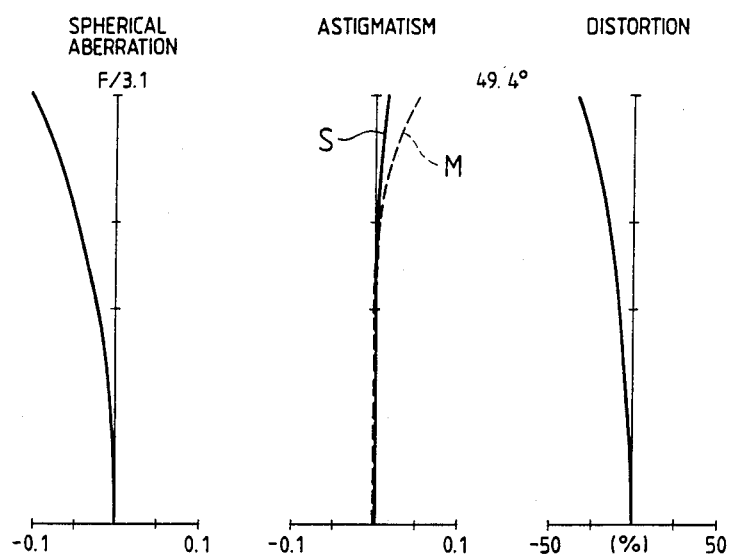
Figure 13:
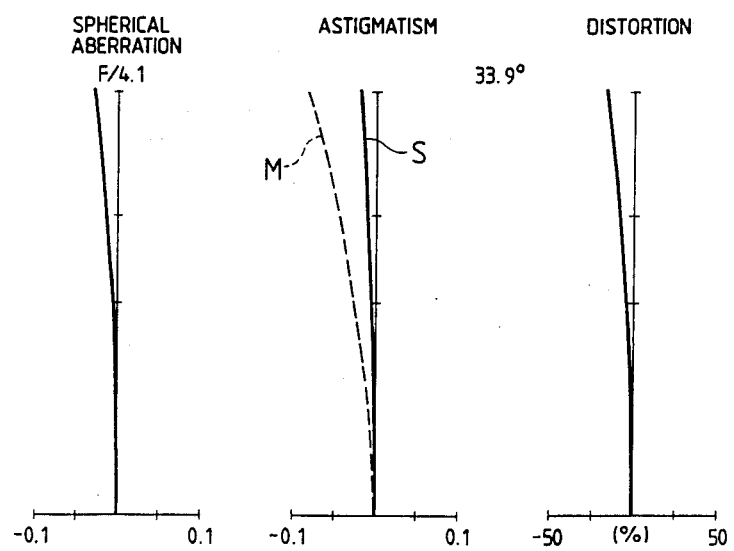
Figure 14:
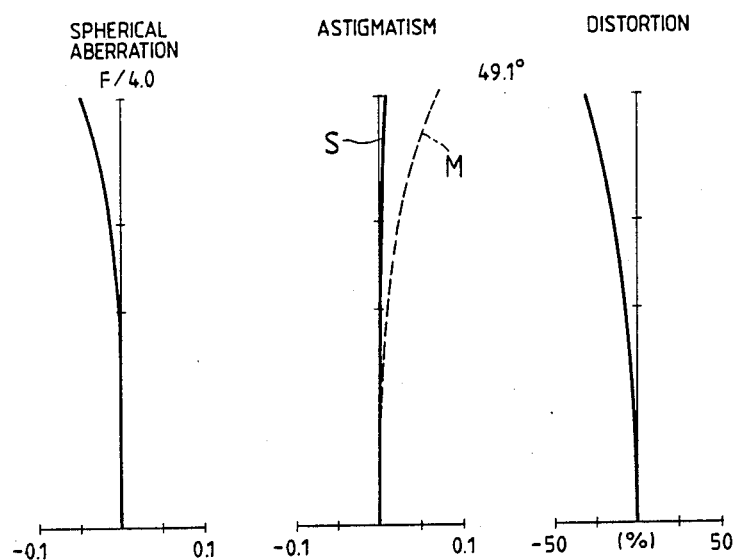
Figure 15:
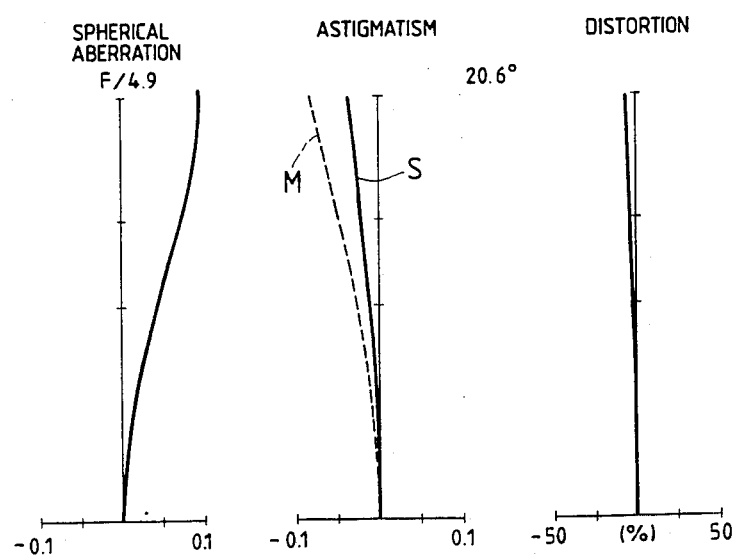
Figure 16:
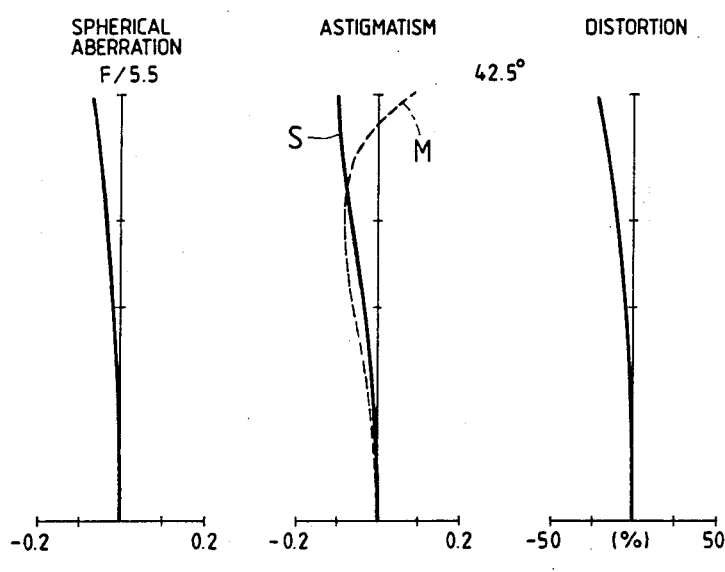
Figure 17:
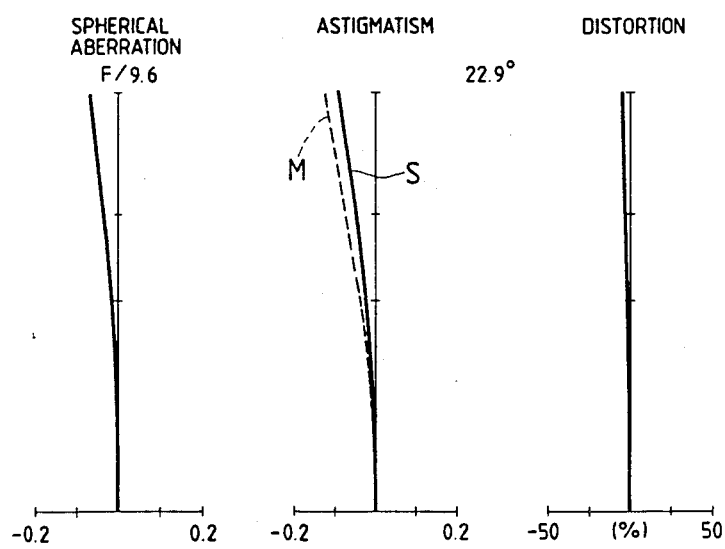
Figure 18:
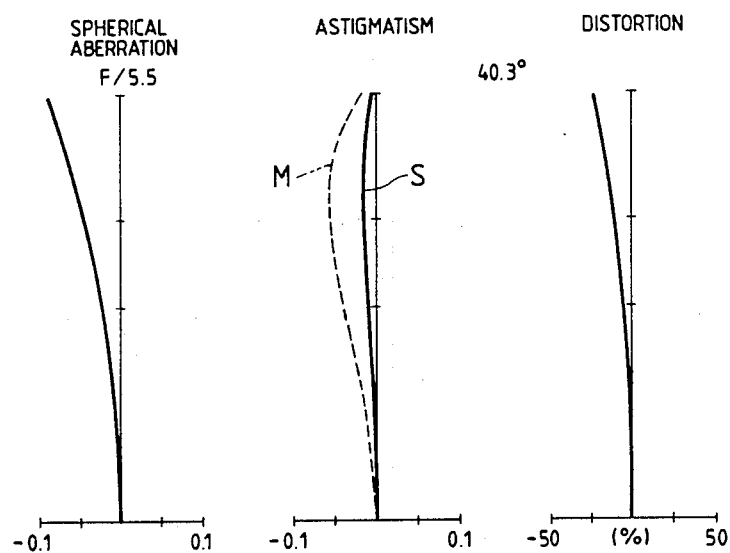
Figure 19:
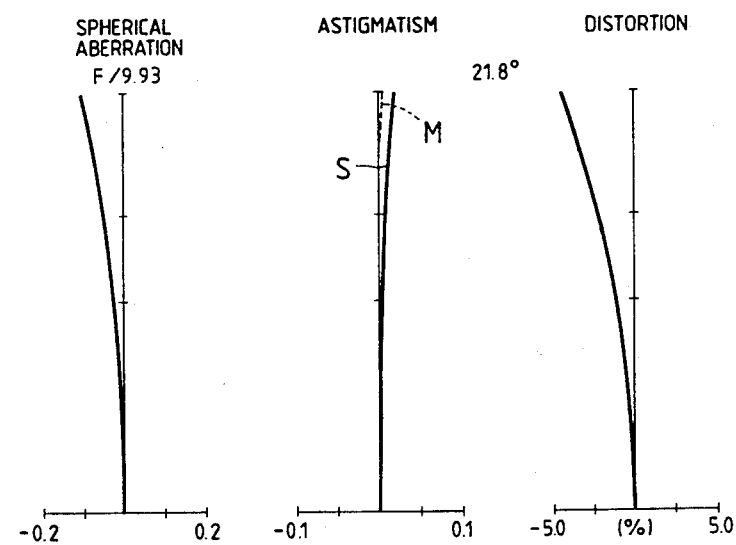
Figure 20:
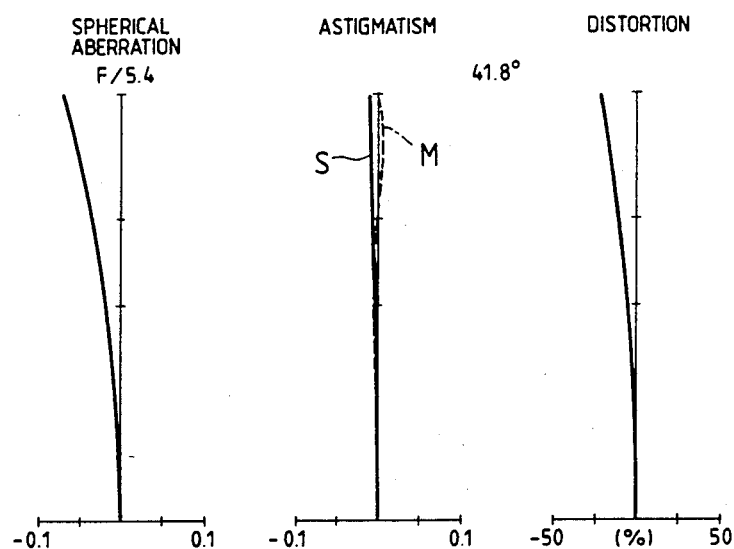
Figure 21:
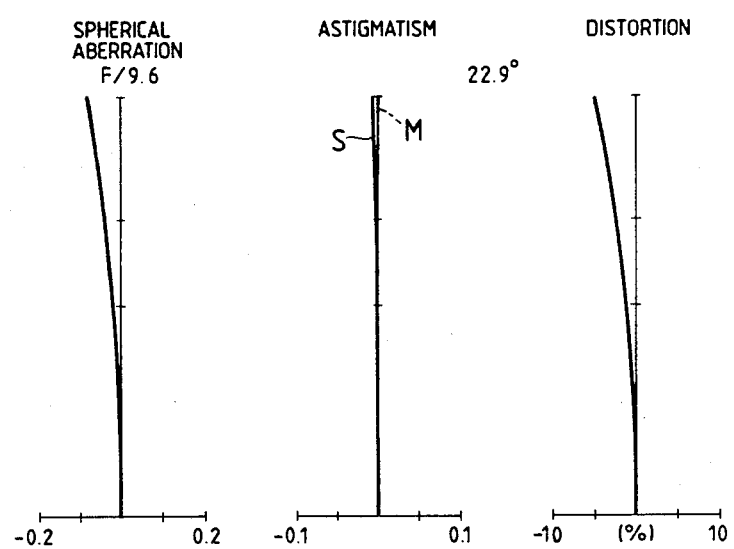
Figure 22:
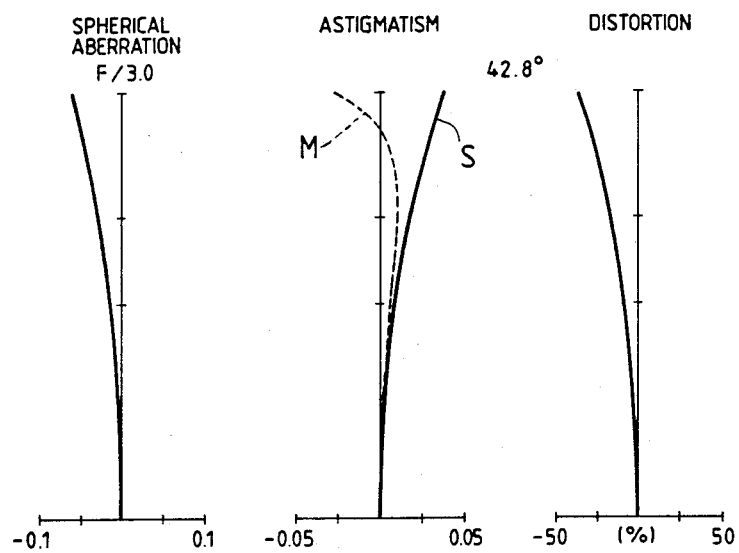
Figure 23:
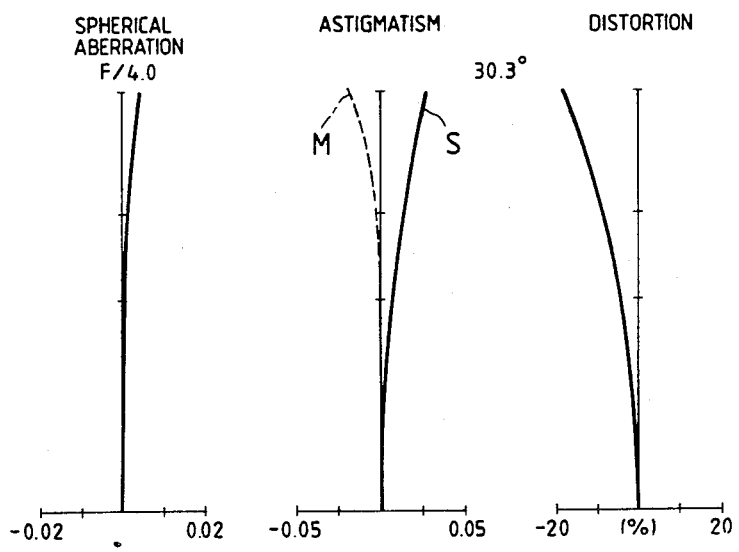

Aberration characteristics of the Embodiments 1 through 7 are visualized in FIG. 10 through FIG. 16. Speaking concretely, FIG. 10 and FIG. 11 illustrate aberration characteristics of the Embodiment 1 in the shorter focal length condition and the longer focal length condition thereof respectively, FIG. 12 and FIG. 3 illustrate aberration characteristics of the Embodiment 2 in the shorter focal length condition and the longer focal length condition thereof respectively, FIG. 14 and FIG. 15 visualize aberration characteristics of the Embodiment 3 in the shorter focal length condition and the longer focal length condition thereof respectively, FIG. 16 and FIG. 17 visualize aberration characteristics of the Embodiment 4 in the shorter focal length condition and the longer focal length condition thereof respectively, FIG. 18 and FIG. 19 show aberration characteristics of the Embodiment 5 in the shorter focal length condition and the longer focal length condition thereof respectively, FIG. 20 and FIG. 21 show aberration characteristics of the Embodiment 6 in the shorter focal length condition and the longer focal length condition thereof respectively, and FIG. 22 and FIG. 23 illustrate aberration characteristics of the Embodiment 7 in the shorter focal length condition and the longer focal length condition thereof respectively.

Though the optimum object point and depth of field in the longer focal length condition can be set by various methods as described above with reference to the Embodiments, it is desirable from viewpoint of operability of endoscopes to set the depth of field in the longer focal length condition so as to be more or less overlapped with that in the shorter focal length condition.

The objective lens system for endoscopes according to the present invention has a simple composition consisting only of two or three lens groups, is capable of making compatible the observation at a wide field angle with an adequate depth of field and the observation of magnified images with a certain distance reserved to an object, and enables accurate diagnosis within a short time through searching for an abnormal location and observation of magnified images.

I claim:

1. An objective lens system for endoscopes comprising, in the order from the object side, a foremost first lens group having negative refractive power and a second lens group having positive refractive power, and so adapted as to perform variation of focal length and focusing at the same time by shifting said second lens group, with said first lens group kept fixed, along the optical axis in such a manner that magnification of said second lens group satisfies the following condition:

$$\beta_{2T}' < -1 < \beta_{2W}'$$

wherein the reference symbols $\beta_{2T}'$ represents magnification of the second lens group in the longer focal length condition and the reference symbol $\beta_{2W}'$ designates magnification of the second lens group in the shorter focal length condition.

2. An objective lens system for endoscopes according to claim 1 wherein a third lens group is fixed on the optical axis on the image side of said second lens group.

3. An objective lens system for endoscopes according to claim 1 or 2 satisfying the following conditions:

$$-0.95 < \beta_{2W}' < -0.5$$

$$1 < f_2/f_W < 4$$

wherein the reference symbol $f_2$ represents focal length of the second lens group and the reference symbol $f_W$ designates focal length of the objective lens system as a whole at the shorter focal length condition thereof.

4. An objective lens system according to claim 1 or 2 wherein said second lens group comprises a cemented surface having negative refractive power.

5. An objective lens system for endoscopes according to claim 2 wherein said third lens group comprises a cemented surface having negative refractive power.

6. An objective lens system for endoscopes according to claim 1 or 2 wherein the lens surface arranged on the extremely object side in said second lens group has positive refractive power.

7. An objective lens system for endoscopes according to claim 1 or 2 wherein said second lens group comprises at least two positive single-element lens components arranged in the order from the object side.

8. An objective lens system for endoscopes according to claim 4 wherein said first lens group comprises a cemented surface having positive refractive power.

9. An objective lens system for endoscopes according to claim 1 or 2 comprising at least one aspherical surface.

10. An objective lens system for endoscopes according to claim 1 or 2 wherein said first lens group comprises an aspherical surface having negative curvature lowered as the aspherical surface becomes farther from the optical axis or positive curvature enhanced as the aspherical surface becomes farther from the optical axis.

11. An objective lens system for endoscopes according to claim 1 or 2 wherein an aperture stop is arranged between the first lens group and the second lens group, and said aperture stop is movable integrally with said second lens group along the optical axis.

12. An objective lens system for endoscopes according to claim 9 wherein said second lens group comprises at least one aspherical surface.

13. An objective lens system for endoscopes according to claim 5 wherein said first lens group comprises a cemented surface having positive refractive power.

14. An objective lens system for endoscopes according to claim 6 wherein said first lens group comprises an aspherical surface having negative curvature lowered as the aspherical surface becomes farther from the optical axis or positive curvature enhanced as the aspherical surface becomes farther from the optical axis.

* * * * *